(12) United States Patent
Chien

(10) Patent No.: US 11,632,618 B1
(45) Date of Patent: Apr. 18, 2023

(54) EARPHONE MODULE

(71) Applicant: Merry Electronics Co., Ltd., Taichung (TW)

(72) Inventor: Jui-Hsien Chien, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 0 days.

(21) Appl. No.: 17/668,390

(22) Filed: Feb. 10, 2022

(30) Foreign Application Priority Data

Dec. 16, 2021 (TW) ................. 110147294

(51) Int. Cl.
| | |
|---|---|
| *H04R 1/10* | (2006.01) |
| *H04R 3/04* | (2006.01) |
| *H01Q 1/48* | (2006.01) |
| *H01Q 1/27* | (2006.01) |
| *H01Q 13/10* | (2006.01) |
| *G06F 3/041* | (2006.01) |
| *H04R 5/02* | (2006.01) |

(52) U.S. Cl.
CPC ........... *H04R 1/1041* (2013.01); *G06F 3/041* (2013.01); *H01Q 1/273* (2013.01); *H01Q 1/48* (2013.01); *H01Q 13/10* (2013.01); *H04R 1/1016* (2013.01); *H04R 1/1058* (2013.01); *H04R 3/04* (2013.01); *H04R 2420/07* (2013.01)

(58) Field of Classification Search
CPC .. H04R 1/1041; H04R 1/1016; H04R 1/1058; H04R 3/04; H04R 2420/07; G06F 3/041; H01Q 1/273; H01Q 1/48; H01Q 13/10
See application file for complete search history.

(56) References Cited

U.S. PATENT DOCUMENTS

2022/0278441 A1* 9/2022 Kodama .................. H01Q 1/48

\* cited by examiner

*Primary Examiner* — Ammar T Hamid
(74) *Attorney, Agent, or Firm* — JCIPRNET

(57) ABSTRACT

An earphone module, including a housing, a circuit board, a feeding conductor, a first grounding conductor, and a second grounding conductor, is provided. The housing includes an insulating housing and a metal ring connected thereto. The metal ring serves as an antenna and includes a feeding end, a first ground end, a second ground end, and a slit that splits the metal ring. The slit is located between the feeding end and the first ground end. The second ground end is located between the feeding end and the slit. The circuit board is located in the insulating housing. A slot is formed between the circuit board and the metal ring. The feeding conductor is connected to the feeding end and the circuit board. The first grounding conductor is connected to the first ground end and the circuit board. The second grounding conductor is connected to the second ground end and the circuit board.

12 Claims, 9 Drawing Sheets

EARPHONE MODULE

CROSS-REFERENCE TO RELATED APPLICATION

This application claims the priority benefit of Taiwan application serial no. 110147294, filed on Dec. 16, 2021. The entirety of the above-mentioned patent application is hereby incorporated by reference herein and made a part of this specification.

BACKGROUND

Technical Field

The disclosure relates to an earphone module, and in particular to an earphone module with a slot antenna.

Description of Related Art

Bluetooth earphones generally have an electric antenna framework, and a relative distance is required to be reserved between the touch panel and the electric antenna to reduce the electric coupling between the antenna and the touch panel, but the area of the touch panel is thereby limited. In addition, since the electric antenna framework is open-circuited at an end, the electric current there is small and the electric field there is strong, so frequency band deviation is likely to occur due to the human body dielectrics, thereby affecting the antenna efficiency.

SUMMARY

The disclosure provides an earphone module, in which a metal ring is used to serve as the structure of a magnetic antenna whose resonant mode is less likely to be affected by the human body to have higher antenna efficiency.

An earphone module of the disclosure includes a housing, a circuit board, a feeding conductor, a first grounding conductor, and a second grounding conductor. The housing includes an insulating housing and a metal ring connected to the insulating housing. The metal ring serves as an antenna, and the metal ring includes a feeding end, a first ground end, a second ground end, and a slit that splits the metal ring. The slit is located between the feeding end and the first ground end, and the second ground end is located between the feeding end and the slit. The circuit board is located in the insulating housing, and a slot is formed between the circuit board and the metal ring. The feeding conductor is connected to the feeding end and the circuit board. The first grounding conductor is connected to the first ground end and the circuit board. The second grounding conductor is connected to the second ground end and the circuit board.

In an embodiment of the disclosure, a segment from the feeding end to the first ground end along the metal ring serves as a resonant path of the antenna. The resonant path enables the slot to be coupled to form a frequency band, and a length of the resonant path is 0.5 times a wavelength of the frequency band.

In an embodiment of the disclosure, the earphone module further includes a flexible circuit board located in the insulating housing and connected to the circuit board. A projection of the flexible circuit board on the metal ring overlaps with a portion at half of the resonant path from the feeding end along the metal ring.

In an embodiment of the disclosure, the earphone module further includes a third grounding conductor. The metal ring further includes a third ground end located between the first ground end and the slit and close to the slit. The third grounding conductor is connected to the third ground end and the circuit board.

In an embodiment of the disclosure, a segment from the feeding end to the first ground end along the metal ring serves as a low pass filter, and a segment from the feeding end to the second ground end along the metal ring serves as a high pass filter.

In an embodiment of the disclosure, the second grounding conductor is away from the feeding end and the slit.

In an embodiment of the disclosure, a width of the slit ranges from 0.2 mm to 0.5 mm.

In an embodiment of the disclosure, the metal ring is located above the circuit board.

In an embodiment of the disclosure, the earphone module further includes a flexible circuit board located in the insulating housing and connected to the circuit board. A distance between the metal ring and the flexible circuit board is at least greater than 1 mm.

In an embodiment of the disclosure, the earphone module further includes a touch panel exposed on the housing. The metal ring is located below the touch panel or is flush with the touch panel.

In an embodiment of the disclosure, when the earphone module is placed in a human ear, the feeding end is close to an antihelix of the human ear and is away from an earlobe, and the first ground end is close to a tragus of the human ear.

In an embodiment of the disclosure, when the earphone module is placed in a human ear, the circuit board is located between the metal ring and an external ear canal of the human ear, so that the antenna generates an antenna polarization direction directed into the external ear canal.

Based on the above, the housing of the earphone module of the disclosure includes the insulating housing and the metal ring connected to the insulating housing. The metal ring serves as the antenna, and the metal ring includes the feeding end, the first ground end, the second ground end, and the slit that splits the metal ring. The slit is located between the feeding end and the first ground end, and the second ground end is located between the feeding end and the slit. The circuit board is located in the insulating housing, and a slot is formed between the circuit board and the metal ring. The feeding conductor is connected to the feeding end and the circuit board. The first grounding conductor is connected to the first ground end and the circuit board. The second grounding conductor is connected to the second ground end and the circuit board. With the above design, the earphone module of the disclosure has the structure of the magnetic antenna whose resonant mode is less likely to be affected by the human body to have higher antenna efficiency.

DESCRIPTION OF THE EMBODIMENTS

Figure 1:
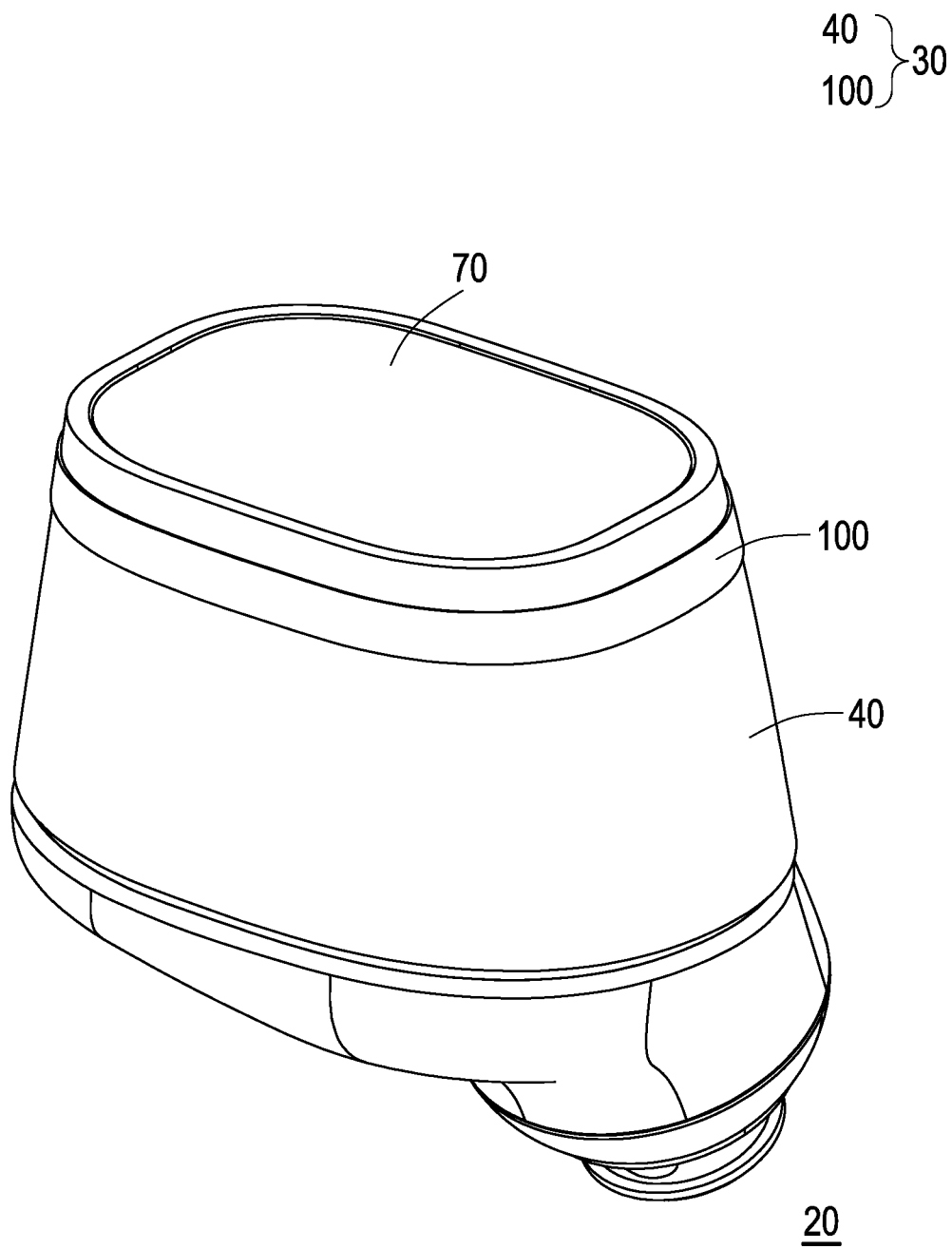
FIG. 1 is a schematic view of an appearance of an earphone module according to an embodiment of the disclosure.
Figure 2A:
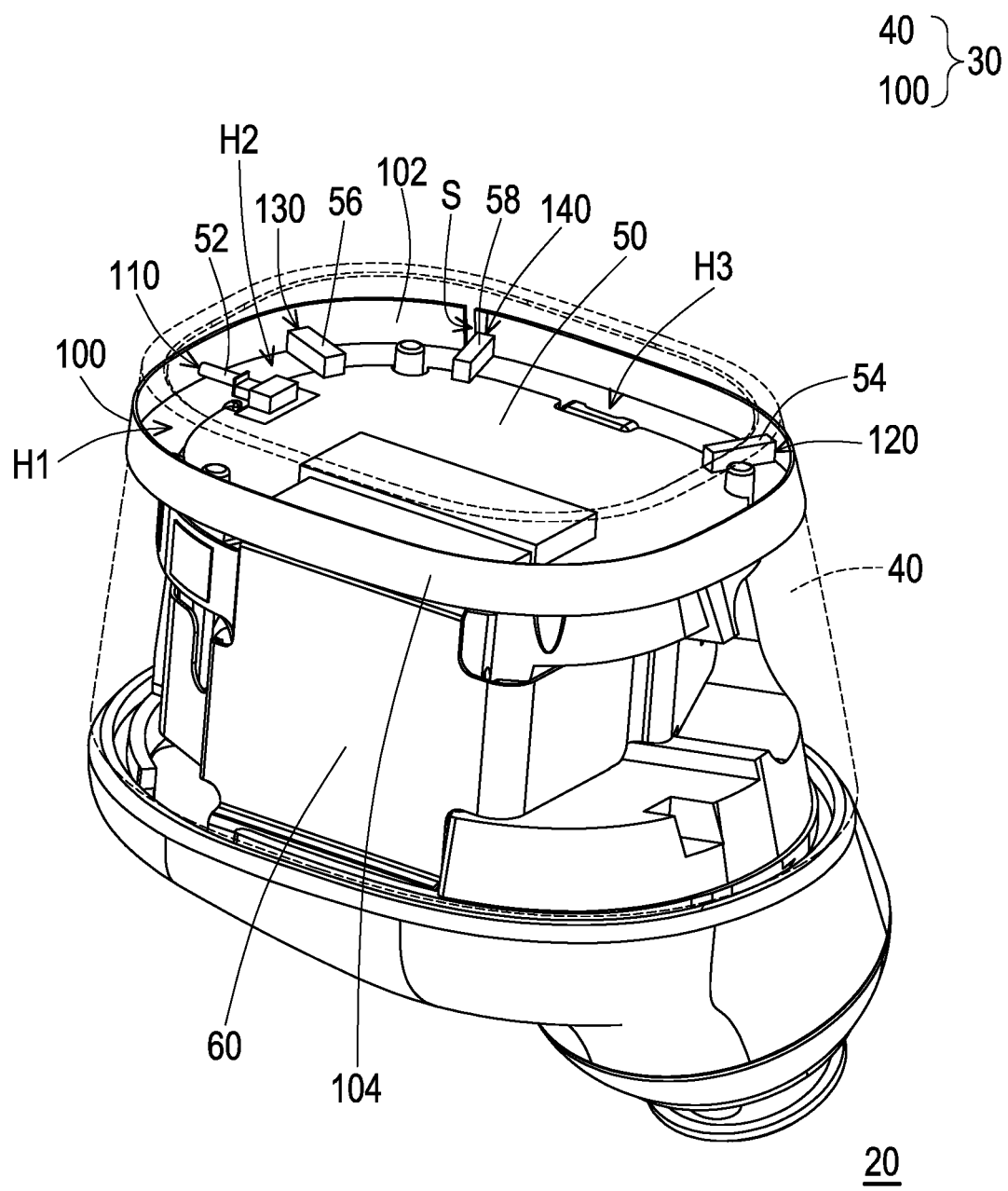
FIG. 2A is a perspective schematic view of the earphone module in FIG. 1.

FIG. 1 is a schematic view of an appearance of an earphone module according to an embodiment of the disclosure. FIG. 2A is a perspective schematic view of the earphone module in FIG. 1. Referring to FIG. 1 and FIG. 2A, an earphone module 20 of the embodiment includes a housing 30. The housing 30 includes an insulating housing 40 and a metal ring 100 connected to the insulating housing 40. A material of the insulating housing 40 is, for example, plastic, but not limited thereto.

In the embodiment, the metal ring 100 serves as an antenna. As shown in FIG. 2A, the metal ring 100 includes a feeding end 110, a first ground end 120, a second ground end 130, and a slit S that splits the metal ring 100. The slit S is located in a segment from the feeding end 110 to the first ground end 120 in a clockwise direction, and the second ground end 130 is located in a segment from the feeding end 110 to the slit S in the clockwise direction. A width of the slit S ranges from 0.2 mm to 0.5 mm, which maintains a relatively complete appearance design while preserving sufficient manufacturing tolerances.

The earphone module 20 of the embodiment further includes a circuit board 50, a feeding conductor 52, a first grounding conductor 54, and a second grounding conductor 56. The circuit board 50 is located in the insulating housing 40. The feeding conductor 52, the first grounding conductor 54, and the second grounding conductor 56 respectively connect the feeding end 110, the first ground end 120, and the second ground end 130 to the circuit board 50.

In the embodiment, a segment from the feeding end 110 to the first ground end 120 along the metal ring 100 in a counterclockwise direction serves as a resonant path of the antenna. A length of the resonant path is 0.5 times a wavelength of a frequency band formed by the coupling of the antenna, and the frequency band formed by the coupling of the antenna is, for example, a 2.4 GHz Bluetooth frequency band, but the frequency band is not limited thereto. The length of the resonant path ranges from 34 mm to 36 mm to couple to form a 2.4 GHz operating frequency band.

Furthermore, in the embodiment, the metal ring 100 further optionally includes a third ground end 140. The third ground end 140 is located between the first ground end 120 and the slit S and is close to the slit S, and the slit S is located between the second ground end 130 and the third ground end 140. The earphone module 20 of the embodiment further includes a third grounding conductor 58, which is connected to the third ground end 140 and the circuit board 50.

There are slots H1, H2, and H3 between the metal ring 100 and the circuit board 50. Specifically, there is the slot H1 between the segment of the metal ring 100 from the feeding end 110 to the first ground end 120 in the counterclockwise direction and the circuit board 50. There is the slot H2 between the segment of the metal ring 100 from the feeding end 110 to the second ground end 130 in the clockwise direction and the circuit board 50. There is the slot H3 between the segment of the metal ring 100 from the first ground end 120 to the third ground end 140 and the circuit board 50.

In the embodiment, the slots H1, H2, and H3 between the metal ring 100 and the circuit board 50 may be filled with plastic and contain air. Considering that a relative dielectric constant of air is 1 and a relative dielectric constant of plastic is from 2.7 to 3.0, the length of the segment from the feeding end 110 passing through the first ground end 120 and the third ground end 140 to the slit S along the metal ring 100 in the counterclockwise direction ranges from 45 mm to 50 mm and is, for example, 47 mm. The segment is connected to a grounding surface of the circuit board 50 through the third ground end 140, which facilitates forming of the 2.4 GHz operating frequency band.

It is worth mentioning that in the embodiment, the segment from the feeding end 110 to the first ground end 120 along the metal ring 100 in the counterclockwise direction may also serve as a low pass filter. That is to say, the segment from the feeding end 110 to the first ground end 120 along the metal ring 100 serves as the resonant path to enable the slot to be coupled to form the 2.4 GHz frequency band, and the segment also serves as the low pass filter.

Moreover, in the embodiment, the segment from the feeding end 110 to the second ground end 130 along the metal ring 100 in the clockwise direction may serve as a high pass filter. Besides, the second grounding conductor 56 connected to the second ground end 130 is disposed at a position away from the feeding end 110 and the slit S in the segment from the feeding end 110 to the slit S. Such design enables an antenna system to optimize impedance matching.

In addition, in the embodiment, the first grounding conductor 54, the second grounding conductor 56, the third grounding conductor 58, the feeding conductor 52, the metal ring 100, and the housing 30 may be made by injection molding to become a whole or by laser direct structuring (LDS) to form the metal ring 100. However, the forming manners of the first grounding conductor 54, the second grounding conductor 56, the third grounding conductor 58, and the metal ring 100 are not limited thereto.

As shown in FIG. 2A, in the embodiment, the earphone module 20 further includes a flexible circuit board 60 located in the insulating housing 40 and connected to the circuit board 50. A projection of the flexible circuit board 60 on the metal ring 100 overlaps with a portion at half of the resonant path from the feeding end 110 along the metal ring 100.

Specifically, the position of the flexible circuit board 60 closest to the metal ring 100 is at half of the resonant path from the feeding end 110 to the first grounding conductor 54 along the metal ring 100 in the counterclockwise direction. Here, since the surface currents on the slot H1 cancel each other out in the half-wavelength resonance, the position is a current zero point 104. In the earphone module 20, the flexible circuit board 60 is placed close to the current zero point 104 on the metal ring 100, the reactance storage between the metal ring 100 and the flexible circuit board 60 can be reduced while facilitating the impedance matching of the antenna, so that the antenna can have preferable efficiency.

In a conventional electric antenna framework disposed in the housing, since the electric antenna is open-circuited at an end, an electric current there is small and an electric field there is strong, the radiation energy is easily absorbed by external dielectrics, such as human body, which results in an operating frequency band deviation of the antenna. Furthermore, in an earphone module with an electric antenna framework, an antenna clearance area is required to be provided along the antenna path on the mainboard, so the space on the mainboard cannot be completely utilized by the circuit layout.

Compared with the conventional electric antenna framework, the metal ring 100 in the embodiment serves as a magnetic antenna framework, which forms a forced boundary by structures such as the feeding end 110, the first grounding conductor 54, the second grounding conductor 56, and the third grounding conductor 58, and the impedance matching may be adjusted according to the operating frequency band, so that a resonant mode of the magnetic antenna is less likely to be affected by the human body to have higher antenna efficiency. In addition, since the antenna in the embodiment may have a Bluetooth antenna matching circuit by the design of the low pass filter, the high pass filter, and the impedance tuning, the antenna clearance area is not required to be provided on the circuit board 50 of the earphone module 20 in the embodiment, and the space on the circuit board 50 can be fully utilized.

In addition, as shown in FIG. 1, the earphone module 20 is a touch earphone module and further includes a touch panel 70 exposed on the housing 30. As shown in FIG. 2A, the metal ring 100 is located above the circuit board 50 and may be optionally located below the touch panel 70 (FIG. 1) or flush with the touch panel 70. That is to say, the metal ring is located between the touch panel 70 and the circuit board 50.

In a conventional electric antenna, a relative distance is required to be reserved between the electric antenna and the touch panel to reduce the electric coupling between the antenna and the touch panel, so an area of the touch panel is limited to prevent the distance between the touch panel (for example, at edge portions) and the electric antenna from being too close. Since the earphone module 20 in the embodiment adopts the magnetic antenna framework, the touch panel 70 of the earphone module 20 does not require to be too far away from an edge of the metal ring 100. Therefore, a larger area of the touch panel 70 can be adopted, so that the touch operation is more convenient.

Figure 2B:
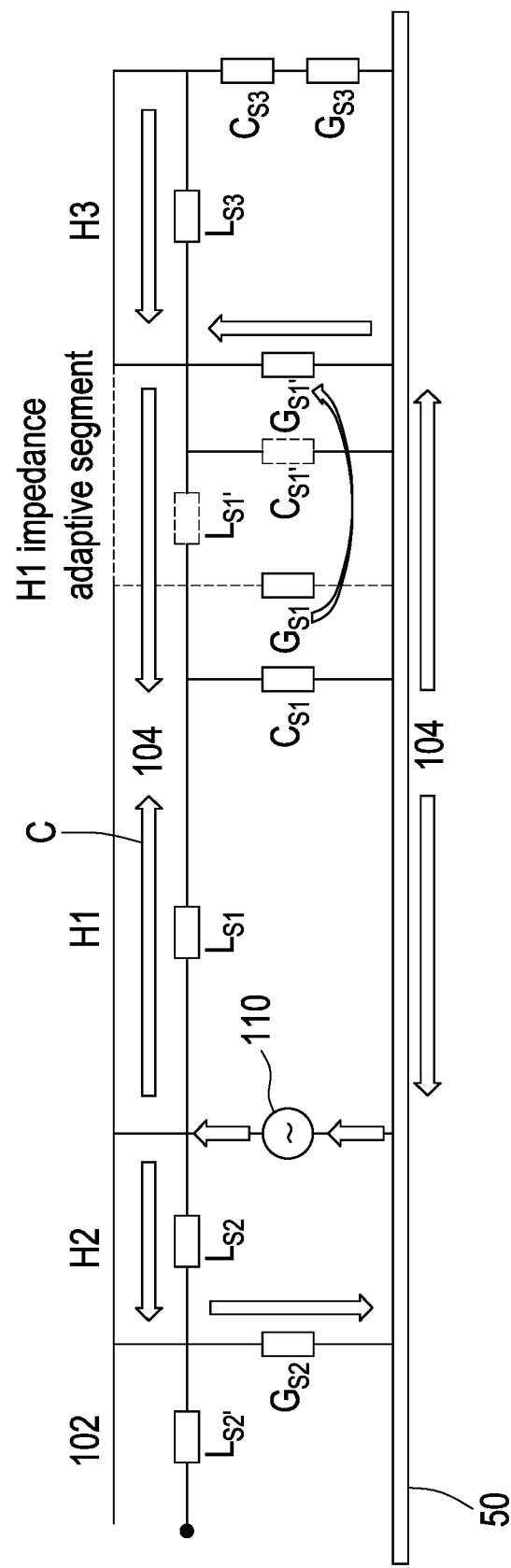
FIG. 2B is an equivalent circuit diagram of slots of the earphone module in FIG. 1.

FIG. 2B is an equivalent circuit diagram of slots of the earphone module in FIG. 1. Referring to FIG. 2B, the reference numerals in FIG. 2B are first explained. C si refers to an equivalent capacitance between a portion of the metal ring 100 corresponding to the slot H1 and the circuit board 50. $C_{S1'}$ refers to an equivalent capacitance between a portion of the metal ring 100 corresponding to the adjusted slot H1 and the circuit board 50 after the first grounding conductor 54 is moved. $C_{S2}$ refers to an equivalent capacitance between a portion of the metal ring 100 corresponding to the slot H2 and the circuit board 50. $C_{S3}$ refers to an equivalent capacitance between a portion of the metal ring 100 corresponding to the slot H3 and the circuit board 50.

$G_{S1}$ refers to a setting position of the first grounding conductor 54. $G_{S1'}$ refers to a setting position of the first grounding conductor 54 after the first grounding conductor 54 is moved. $G_{S2}$ refers to a setting position of the second grounding conductor 56. $G_{S3}$ refers to a setting position of the third grounding conductor 58.

$L_{S1}$ refers to an equivalent inductance of the slot H1 on the metal ring 100. Ls refers to an equivalent inductance of the slot H1 on the metal ring 100 after the first grounding conductor 54 is moved. $L_{S2}$ refers to an equivalent inductance of the slot H2 on the metal ring 100. $L_{S2'}$ refers to an equivalent inductance of the metal ring 100 at an open-circuited residual segment 102. $L_{S3}$ refers to an equivalent inductance of the slot H3 on the metal ring 100. An arrow direction in FIG. 2B refers to a flow direction of a surface current C.

In FIG. 2B, when the first grounding conductor 54 is moved (i.e., the setting position $G_{S1}$ of the first grounding conductor 54 is adjusted to $G_{S1'}$), the slot H1 impedance adaptive segment may be introduced into a slot H1. At this moment, a length of the slot H1 is 36 mm, and a range of the slot H1 impedance adaptive segment may fall within 2 mm. Such design enables the length of the resonant path to range from 34 mm to 36 mm, so that the slot is coupled to form the 2.4 GHz operating frequency band.

Furthermore, since the slot H2 is related to the setting position $G_{S2}$ of the second grounding conductor 56, a designer may adjust an equivalent parallel inductance value by moving the setting position $G_{S2}$ of the second grounding conductor 56 to compensate for a capacitance of the slot H1 (containing the slot H1 impedance adaptive segment). The open-circuited residual segment 102 may serve as a reserved space for inductance compensation while maintaining the complete appearance of the metal ring 100.

Moreover, the slot H3 is located between the setting position $G_{S1}$ or $G_{S1'}$ of the first grounding conductor 54 and the setting position $G_{S3}$ of the third grounding conductor 58. The slot H3 may be a reserved space for the slot H1 impedance adaptive segment or a portion of an antenna radiation structure.

Figure 2C:
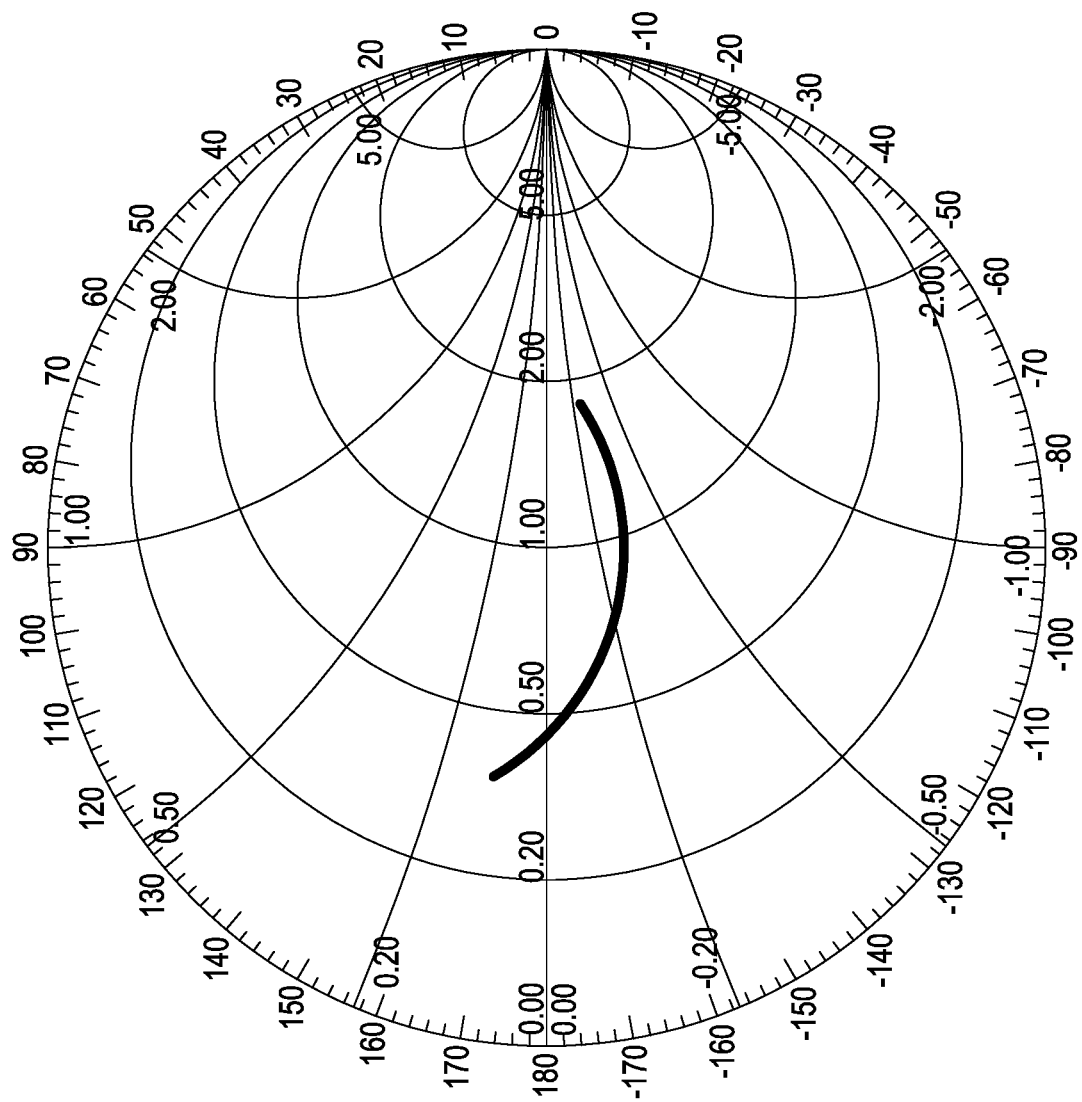
FIG. 2C is a Smith chart of an antenna of the earphone module in FIG. 1.

Therefore, the setting position $G_{S1}$ of the first grounding conductor 54 can be equivalent to an adjustable low pass filter circuit, and the setting position $G_{S2}$ of the second grounding conductor 56 can be equivalent to an adjustable high pass filter circuit, so that the antenna of the earphone module 20 may be provided with a band-pass matching circuit of the Bluetooth frequency band. FIG. 2C is a Smith chart of the earphone module in FIG. 1 in the Bluetooth frequency band, and such adjustment enables the impedance of the antenna system to present preferable impedance matching.

Figure 3A:
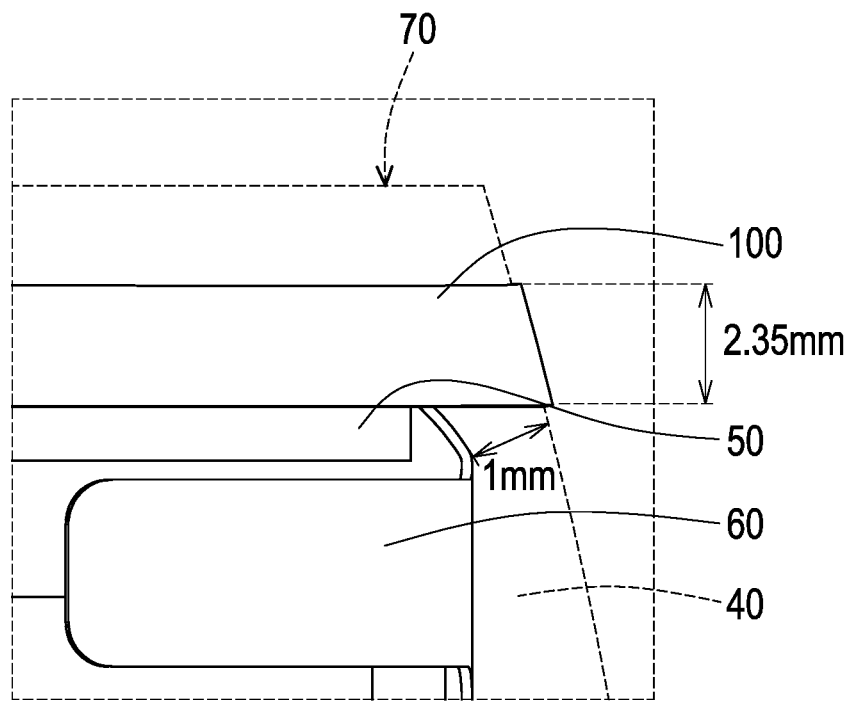
FIG. 3A and FIG. 3B are partial schematic views of a metal ring, a circuit board, and a flexible circuit board of the earphone module in FIG. 1.
Figure 3B:
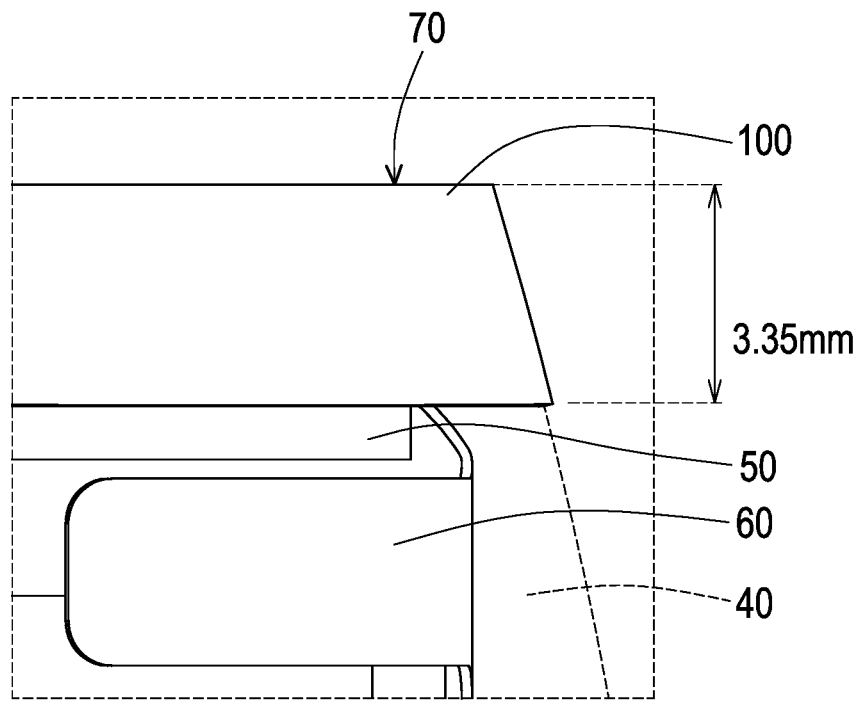

FIG. 3A and FIG. 3B are partial schematic views of the metal ring, the circuit board, and the flexible circuit board of the earphone module. Referring to FIG. 3A, in the embodiment, the metal ring 100 is located below the touch panel 70 (as shown in FIG. 3A), and a width of the metal ring 100 is 2.35 mm. Referring to FIG. 3B, the width of the metal ring 100 may be adjusted toward the direction (upward) of the touch panel 70, so that the metal ring 100 is flush with the touch panel 70 (as shown in FIG. 3B). The width of the metal ring 100 is 3.35 mm. However, the width of the metal ring 100 is not limited thereto.

Figure 4A:
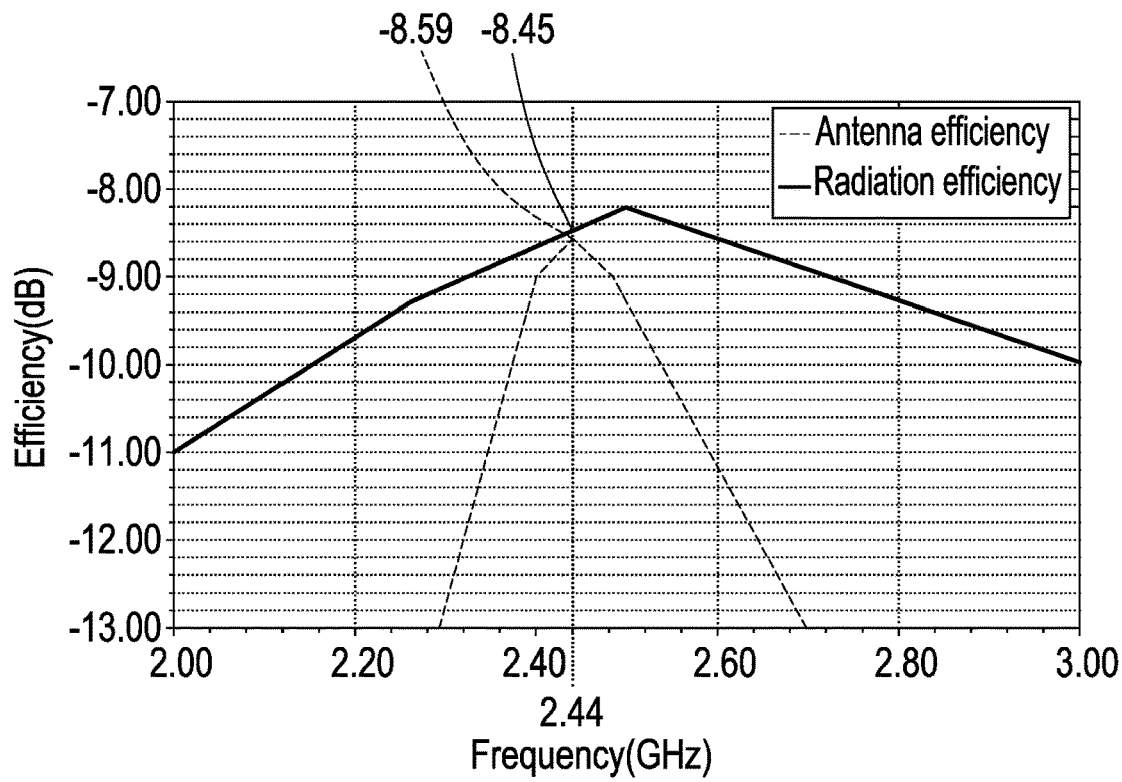
FIG. 4A and FIG. 4B are respectively relationship graphs of efficiency against frequency of the earphone module in FIG. 3A and FIG. 3B.
Figure 4B:
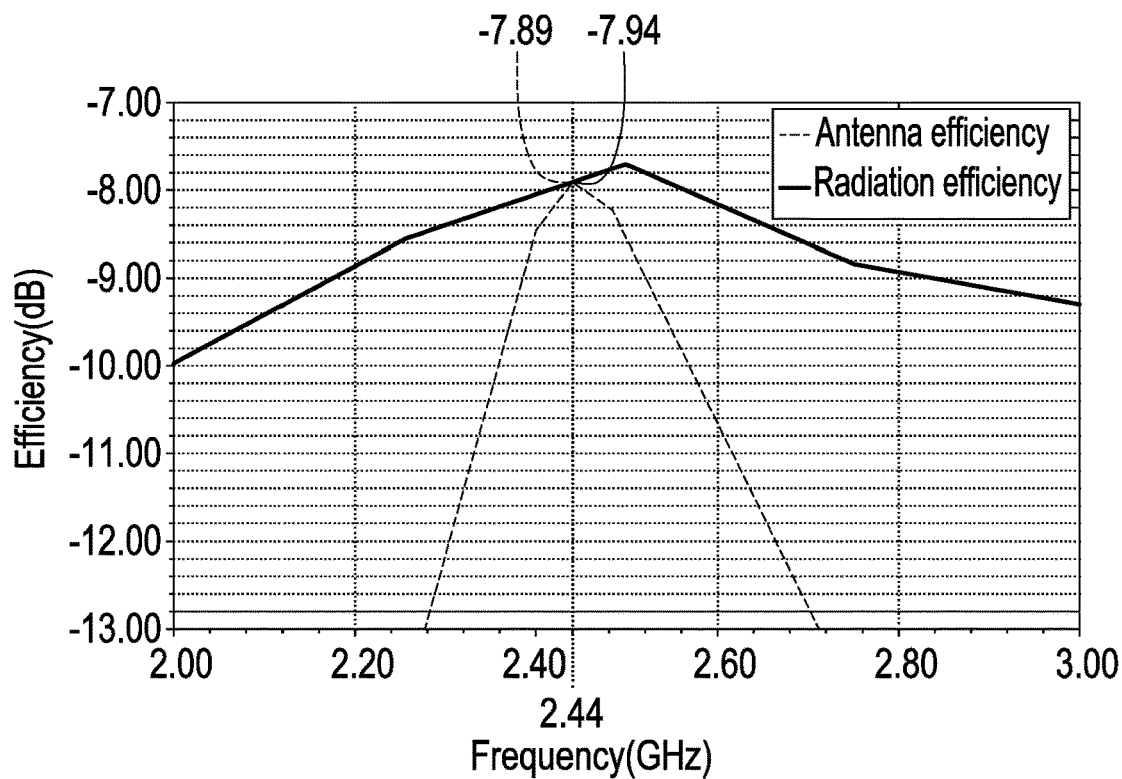

FIG. 4A and FIG. 4B are respectively relationship graphs of efficiency against frequency of the earphone module in FIG. 3A and FIG. 3B. Referring to FIG. 4A, under the 2.4 GHz operating frequency band, when the width of the metal ring 100 is 2.35 mm (FIG. 3A), the antenna efficiency is −8.59 dB and a radiation efficiency is −8.45 dB to have preferable performance. Referring to FIG. 4B, under the 2.4 GHz operating frequency band, when the width of the metal ring 100 is 3.35 mm (FIG. 3B), the antenna efficiency is −7.94 dB and the radiation efficiency is −7.89 dB to also have preferable performance.

In addition, if the metal ring 100 is widened toward the direction of the flexible circuit board 60, although the current zero point 104 facilitates the reduction of a coupling effect between the metal ring 100 and the flexible circuit board 60 due to an overly small spacing, the distance between the metal ring 100 and the flexible circuit board 60 is still required to be at least greater than 1 mm to maintain preferable impedance performance.

In the embodiment, the length of the segment from the feeding end 110 of the antenna to the first grounding conductor 54 along the metal ring 100 in the counterclockwise direction ranges from 34 mm to 36 mm, which is half of the wavelength of the 2.4 GHz frequency, so that a 2.4 GHz signal is formed.

Besides, the earphone module 20 can facilitate the antenna to better couple the 2.4 GHz signal through the following manners. First, considering the relative dielectric constants of air and plastic, the length of the segment from the feeding end 110 to the slit S along the metal ring 100 in the counterclockwise direction ranges from 45 mm to 50 mm. The third grounding conductor 58 is disposed at a position close to the slit S in the segment, so that the segment from the feeding end 110 to the third grounding conductor 58 along the metal ring 100 in the counterclockwise direction is grounded.

Second, the segment from the feeding end 110 to the slit S is the open-circuited residual segment 102. The second grounding conductor 56 is disposed at the position away from the feeding end 110 and the slit S in the segment from the feeding end 110 to the slit S to achieve a preferable impedance matching effect under the premise of coupling 2.4 GHz.

Third, the flexible circuit board 60 is located at half of the segment from the feeding end 110 to the first grounding conductor 54 along the metal ring 100 in the counterclockwise direction to coincide with the current zero point 104. In this way, the electric coupling between the flexible circuit board 60 and the metal ring 100 is thus reduced, so that the magnetic antenna can have a preferable system impedance matching.

Figure 5:
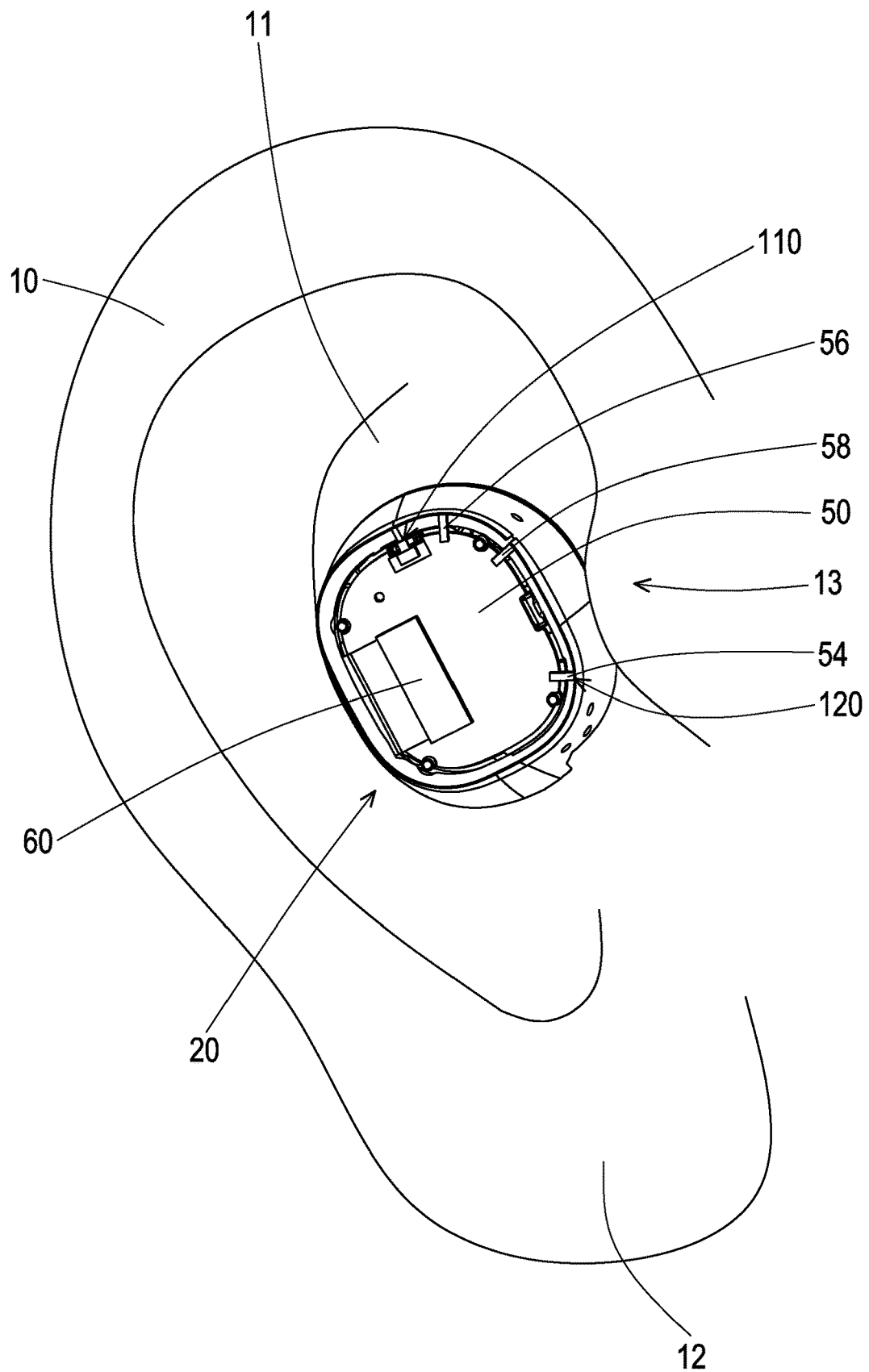
FIG. 5 is a schematic view of placing the earphone module in FIG. 1 in a human ear.

FIG. 5 is a schematic view of the earphone module in FIG. 1 placed in a human ear. It is to be explained that the touch panel 70 is removed from the earphone module 20 in FIG. 5 to clearly show relative positions of the feeding end 110, the first grounding conductor 54, the second grounding conductor 56, the third grounding conductor 58, and a human ear 10. Referring to FIG. 5, the human ear 10 includes an antihelix 11 located above the hole of an ear canal, an earlobe 12 located below the hole of the ear canal, and a tragus 13 located between the hole of the ear canal and the cheek.

There is a Bluetooth connection between the earphone module 20 and an electronic device (not shown, such as a mobile phone or a tablet computer). The mobile phone is taken as an example, and the mobile phone may be placed in a pocket or hand-held. At this time, the Bluetooth connection between the earphone module 20 and the electronic device is blocked by the human body. In the embodiment, when the earphone module 20 is placed in the human ear 10, as shown in FIG. 5, the feeding end 110 is close to the antihelix 11 of the human ear 10 and is away from the earlobe 12, and the first ground end 120 is close to the tragus 13 of the human ear, so that the direction of the antenna radiation is toward the lower right of FIG. 5 (toward the direction of the electronic device). Such setting enables the Bluetooth connection between the earphone module 20 and the electronic device to have preferable cross-body (cross-human body) radiation performance.

Figure 6:
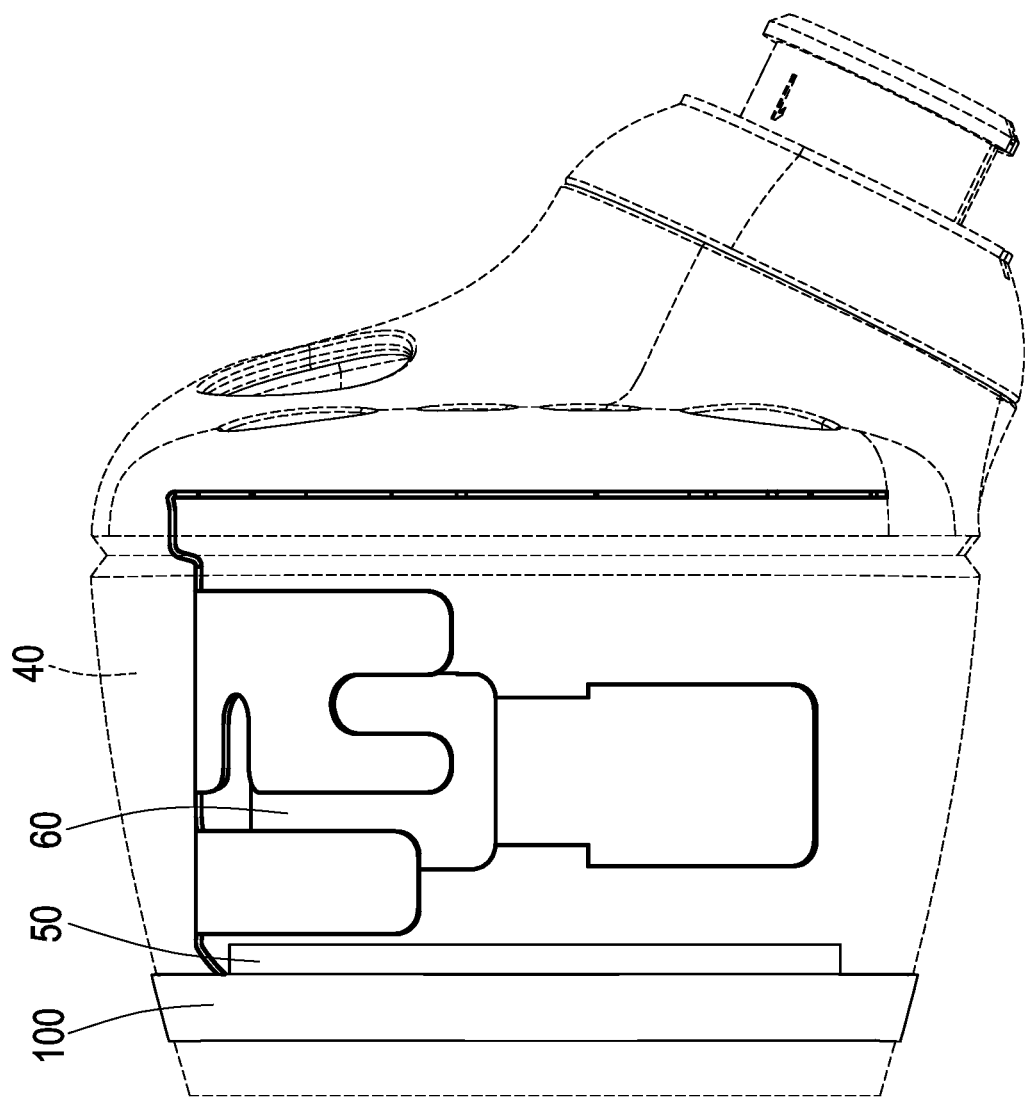
FIG. 6 is a perspective schematic view of the metal ring, the circuit board, and the flexible circuit board of the earphone module in FIG. 5.

FIG. 6 is a perspective schematic view of the metal ring, the circuit board, and the flexible circuit board of the earphone module in FIG. 5. Referring to FIG. 6, when the earphone module 20 is placed in the human ear 10 (FIG. 5), the circuit board 50 is located between the metal ring 100 and an external ear canal of the human ear 10 (FIG. 5, corresponding to the right side of FIG. 6), so that the antenna generates an antenna polarization direction directed into the external ear canal (rightward).

Specifically, the metal ring 100 and the circuit board 50 of the earphone module 20 have relatively positive electricity and negative electricity, the generated antenna polarization direction is from the relatively positive electricity to the relatively negative electricity, and the antenna polarization direction is the direction perpendicular to the circuit board 50. Therefore, when the earphone module 20 is placed in the human ear 10 (which is not shown in FIG. 6 and is located on the right side of the earphone module), the antenna polarization direction generated by the antenna is directed from the metal ring 100 toward the circuit board 50 and finally into the external ear canal. Such setting can reduce the absorption or cancelling out of energy by other structures, such as ear bones, of the external ear to reduce the influence of the human ear 10 on the antenna signal. In addition, since a current distribution of the magnetic antenna framework is limited by the forced boundary formed by the feeding conductor 52 and the first grounding conductor 54, the frequency band deviation due to difference in actual wearing situations can be reduced, which optimizes radiation performance when worn.

Figure 7A:
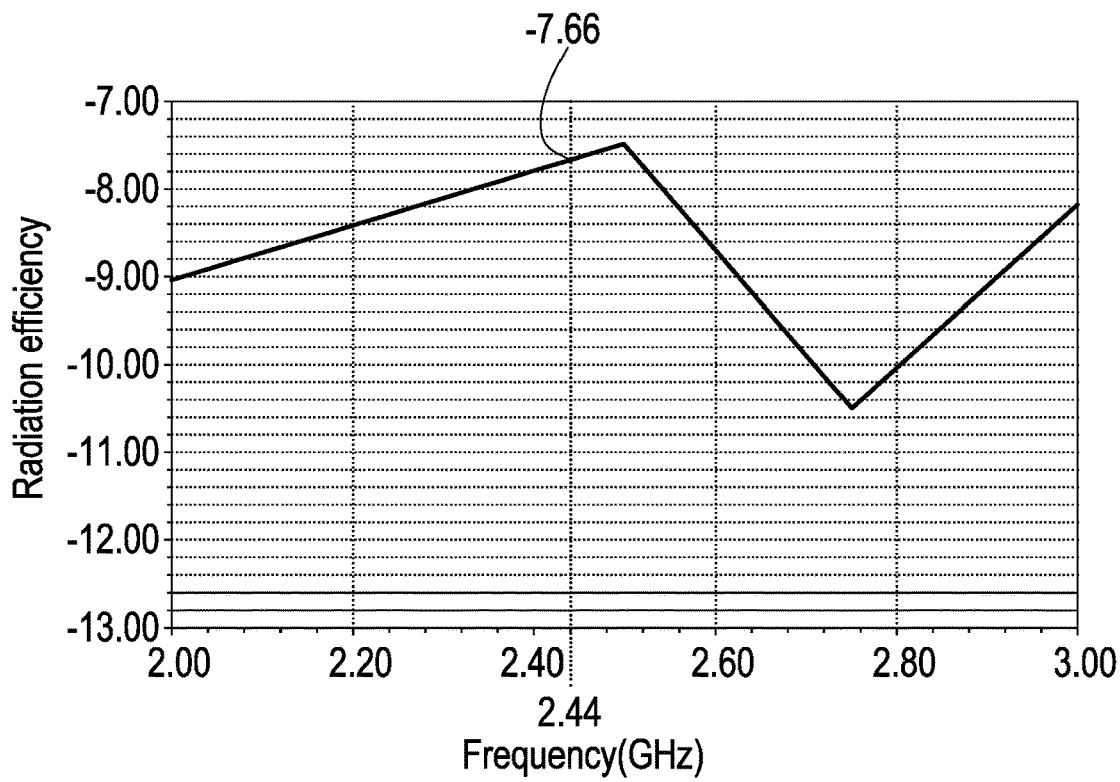
FIG. 7A and FIG. 7B are respectively relationship graphs of efficiency against frequency of the earphone module in FIG. 5 in a BH state and in a BHHR state.
Figure 7B:
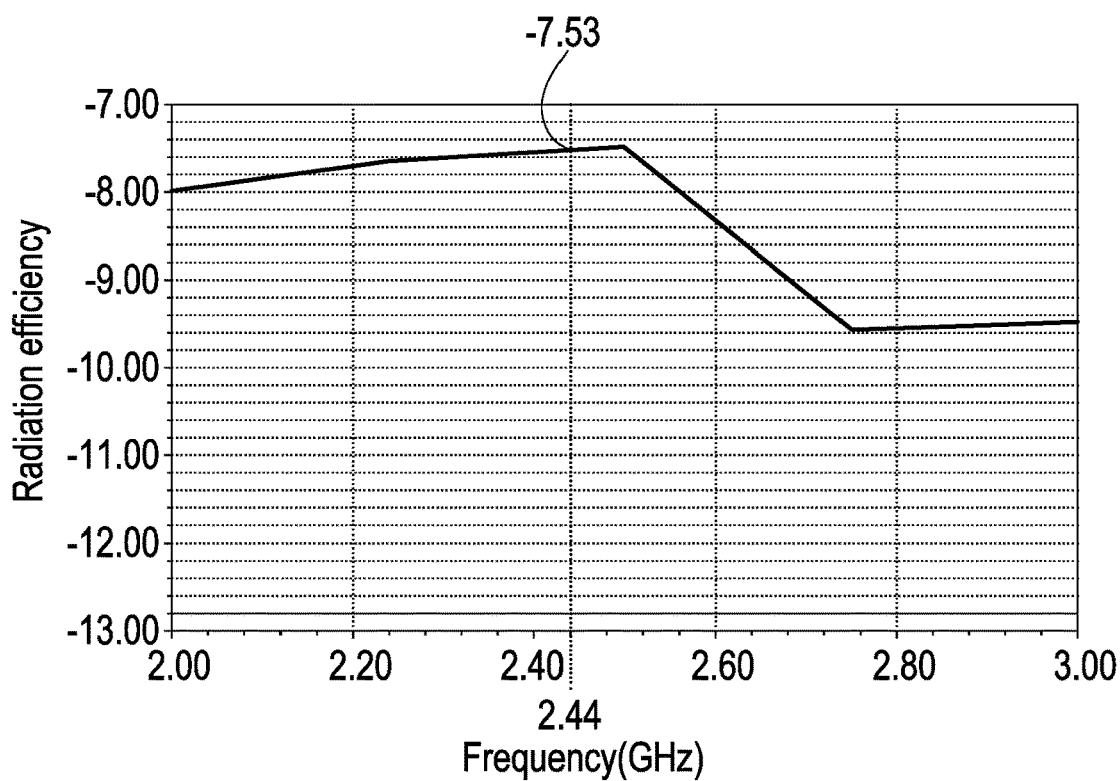

FIG. 7A and FIG. 7B are respectively relationship graphs of efficiency against frequency of the earphone module in FIG. 5 in a BH state and in a BHHR state. Specifically, FIG. 7A is a relationship graph of efficiency against frequency of the antenna when the earphone module is placed in the ear on the right side of the head (BH, which is a state of using the earphone module placed in the right ear). FIG. 7B is a relationship graph of efficiency against frequency of the antenna when the earphone module is placed in the ear on the right side of the head and the right hand is placed on the earphone module (BHHR, which is a state of touching the earphone module placed in the right ear with the right hand).

Referring to FIG. 7A and FIG. 7B, in the embodiment, when the earphone module 20 is placed in the right ear and touched by the right hand, the radiation efficiencies in the 2.4 GHz frequency band are respectively −7.66 dB and −7.53 dB, both of which have preferable performance. Moreover, both radiation efficiencies are not much different, which means that even if the earphone module 20 of the embodiment is touched by the human body dielectrics (for example, a finger), the radiation efficiency of the antenna is not affected. Furthermore, after actual measurements, compared with the conventional antenna module, the antenna radiation efficiencies of the earphone module 20 of the embodiment in different states are respectively enhanced by at least 1.59 dB and 2.67 dB to have preferable performance.

In summary of the above, the housing of the earphone module of the disclosure includes the insulating housing and the metal ring connected to the insulating housing, wherein the metal ring serves as the antenna, and the metal ring includes the feeding end, the first ground end, the second ground end, and the slit that splits the metal ring. The slit is located between the feeding end and the first ground end, and the second ground end is located between the feeding end and the slit. The circuit board is located in the insulating housing, and the slot is formed between the circuit board and the metal ring. The feeding conductor is connected to the feeding end and the circuit board. The first grounding conductor is connected to the first ground end and the circuit board. The second grounding conductor is connected to the second ground end and the circuit board. With the above design, the earphone module of the disclosure has the magnetic antenna structure whose resonant mode is less likely to be affected by the human body to have preferable antenna efficiency. Also, the antenna clearance area is not required to be provided on the circuit board of the earphone module of the disclosure to improve the antenna efficiency, so the space on the circuit board can be fully utilized.

What is claimed is:

1. An earphone module, comprising:
   a housing, comprising an insulating housing and a metal ring connected to the insulating housing, wherein the metal ring serves as an antenna and the metal ring comprises a feeding end, a first ground end, a second ground end, and a slit that splits the metal ring, the slit is located between the feeding end and the first ground end, and the second ground end is located between the feeding end and the slit;
   a circuit board, located in the insulating housing, wherein a slot is formed between the circuit board and the metal ring;
   a feeding conductor, connected to the feeding end and the circuit board;
   a first grounding conductor, connected to the first ground end and the circuit board; and
   a second grounding conductor, connected to the second ground end and the circuit board.

2. The earphone module according to claim 1, wherein a segment from the feeding end to the first ground end along the metal ring serves as a resonant path of the antenna, the resonant path enables the slot to be coupled to form a frequency band, and a length of the resonant path is 0.5 times a wavelength of the frequency band.

3. The earphone module according to claim 2, further comprising a flexible circuit board located in the insulating housing and connected to the circuit board, wherein a projection of the flexible circuit board on the metal ring overlaps with a portion at half of the resonant path from the feeding end along the metal ring.

4. The earphone module according to claim 1, further comprising a third grounding conductor, wherein the metal ring further comprises a third ground end located between the first ground end and the slit and close to the slit, and the third grounding conductor is connected to the third ground end and the circuit board.

5. The earphone module according to claim 4, wherein a segment from the feeding end to the first ground end along the metal ring serves as a low pass filter, and a segment from the feeding end to the second ground end along the metal ring serves as a high pass filter.

6. The earphone module according to claim 1, wherein the second grounding conductor is away from the feeding end and the slit.

7. The earphone module according to claim 1, wherein a width of the slit ranges from 0.2 mm to 0.5 mm.

8. The earphone module according to claim 1, wherein the metal ring is located above the circuit board.

9. The earphone module according to claim 1, further comprising a flexible circuit board located in the insulating housing and connected to the circuit board, wherein a distance between the metal ring and the flexible circuit board is at least greater than 1 mm.

10. The earphone module according to claim 1, further comprising a touch panel exposed on the housing, wherein the metal ring is located below the touch panel or is flush with the touch panel.

11. The earphone module according to claim 1, wherein when the earphone module is placed in a human ear, the feeding end is close to an antihelix of the human ear and is away from an earlobe, and the first ground end is close to a tragus of the human ear.

12. The earphone module according to claim 1, wherein when the earphone module is placed in a human ear, the circuit board is located between the metal ring and an external ear canal of the human ear, so that the antenna generates an antenna polarization direction directed into the external ear canal.

* * * * *